United States Patent
Heitzenrater et al.

(10) Patent No.: US 10,066,676 B2
(45) Date of Patent: Sep. 4, 2018

(54) STEEL CLUTCH HOUSING HAVING SPRAYED ON COATING

(71) Applicant: GM Global Technology Operations LLC, Detroit, MI (US)

(72) Inventors: Scott William Heitzenrater, Orion, MI (US); Fred D. Lewis, Ann Arbor, MI (US); Daniel Richard White, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 337 days.

(21) Appl. No.: 14/936,080

(22) Filed: Nov. 9, 2015

(65) Prior Publication Data

US 2017/0016492 A1 Jan. 19, 2017

Related U.S. Application Data

(60) Provisional application No. 62/193,934, filed on Jul. 17, 2015.

(51) Int. Cl.
*F16D 25/0638* (2006.01)
*F16D 13/68* (2006.01)

(52) U.S. Cl.
CPC ....... *F16D 25/0638* (2013.01); *F16D 13/683* (2013.01); *F16D 2250/0023* (2013.01); *F16D 2250/0046* (2013.01); *F16D 2300/08* (2013.01); *F16D 2300/10* (2013.01); *F16D 2300/26* (2013.01)

(58) Field of Classification Search
CPC ............... F16D 25/0638; F16D 13/683; F16D 2250/0046; F16D 2250/0023; F16D 2300/26; F16D 2300/08; F16D 2300/10
See application file for complete search history.

(56) References Cited

U.S. PATENT DOCUMENTS

| | | | | |
|---|---|---|---|---|
| 3,279,835 A | * | 10/1966 | Krohm .................. | F16B 7/0413 285/321 |
| 4,014,619 A | * | 3/1977 | Good ...................... | F16D 13/52 192/70.2 |
| 5,881,856 A | * | 3/1999 | Prater ..................... | F16D 13/62 192/115 |
| 9,528,557 B1 | * | 12/2016 | Heitzenrater ........... | F16D 47/00 |
| 2005/0204541 A1 | * | 9/2005 | Miyazaki ............... | B21D 51/10 29/557 |

(Continued)

FOREIGN PATENT DOCUMENTS

CN 101910687 A 12/2010

*Primary Examiner* — David J Hlavka

(57) ABSTRACT

The present invention provides a stamped steel friction clutch hubs or housings for use in automatic motor vehicle transmissions having a sprayed on hard steel or ceramic coating on wear surfaces. The clutch hub or housing is fabricated of steel which is stamped and of unitary construction. The clutch hub or housing is complexly configured and includes a center through opening having an inner surface which is contacted by a pair of resilient, axially spaced apart seals. The housing also includes a larger diameter portion having female splines which engage male splines on the periphery of a portion of the clutch plates. The inner surface which is contacted by the resilient seals includes a thin layer of sprayed steel or ceramic material that is machined after application to a desired diameter and surface finish.

15 Claims, 3 Drawing Sheets

(56) References Cited

U.S. PATENT DOCUMENTS

| | | | | |
|---|---|---|---|---|
| 2006/0042903 | A1* | 3/2006 | Oki | B21D 35/006 |
| | | | | 192/70.2 |
| 2007/0193848 | A1* | 8/2007 | Uhler | F16D 13/683 |
| | | | | 192/112 |
| 2011/0297503 | A1* | 12/2011 | Szuba | F16D 13/683 |
| | | | | 192/108 |
| 2011/0315505 | A1* | 12/2011 | Keating | F16D 13/683 |
| | | | | 192/112 |
| 2015/0176659 | A1* | 6/2015 | Bowman | F16D 25/0638 |
| | | | | 192/112 |
| 2015/0362021 | A1* | 12/2015 | Heitzenrater | F16D 13/58 |
| | | | | 192/112 |
| 2016/0376720 | A1* | 12/2016 | Heitzenrater | F16D 49/02 |
| | | | | 74/606 R |

* cited by examiner

STEEL CLUTCH HOUSING HAVING SPRAYED ON COATING

CROSS REFERENCE TO RELATED APPLICATION

This patent application claims the benefit of U.S. Provisional Patent Application Ser. No. 62/193,934, filed Jul. 17, 2015, which is hereby incorporated in its entirety herein by reference.

FIELD

The present disclosure relates to friction clutch hubs or housings for use in automatic motor vehicle transmissions and more particularly to steel friction clutch hubs or housings for use in automatic motor vehicle transmissions having a sprayed on hard steel or ceramic coating on a wear surface.

BACKGROUND

The statements in this section merely provide background information related to the present disclosure and may or may not constitute prior art.

Many friction clutch hubs or housings for use in automatic motor vehicle transmissions are fabricated of steel because of its strength, cost, malleability and machinability. It is not ideal for all clutch applications, however, as certain configurations require specific capabilities not provided by standard steel alloys. For example, certain clutch configurations require hydraulic fluid (transmission oil) transfer under pressure from outside the clutch housing to a hydraulic clutch operator inside the housing. In such configurations, a pair of spaced apart resilient seals disposed in a stationary component of the transmission engage the rotating clutch housing and define a fluid path from the stationary component to the clutch housing and ultimately to the hydraulic operator.

In such a configuration, typical steel alloys, which may be stamped to form the clutch housing, do not exhibit sufficient hardness to withstand the constant sliding friction of the resilient seals. As the steel surface of the clutch housing wears, drag may increase and fluid leakage may occur.

One solution to this problem entails fabricating the clutch housing from separate pieces: a collar or tubular member which is forged and may thus be a relatively hard steel and a bell housing which may be stamped in a conventional fashion which may thus be softer steel. The collar which includes an outer surface which is engaged by the resilient seals is then welded to the bell housing. While this approach provides a clutch housing having the requisite hardness of the surface engaged by the seals, the manufacturing steps and expense relative to a single piece stamped housing are problematic.

Thus, it would be desirable to provide a single piece clutch housing having a hard wear surface that is fabricated of a steel alloy that may be stamped to form the housing. The present invention is so directed.

SUMMARY

The present invention provides a stamped steel friction clutch hub or housing for use in an automatic motor vehicle transmission having a sprayed on hard steel, steel alloy or ceramic coating on a wear surface. The clutch hub or housing is fabricated of steel which is stamped and of unitary construction. The clutch hub or housing is complexly configured and includes a center through opening having an inner surface which is contacted by a pair of resilient fluid tight, axially spaced apart seals. The inner surface which is contacted by the resilient seals includes a thin layer of sprayed metal, including steel, steel alloy or a ceramic material that is machined after application to a desired diameter and surface finish. The inner surface has high hardness and provides reduced friction with the resilient seals and extended service life. The housing also includes a larger diameter portion having female splines which engage male splines on the periphery of a portion of the clutch plates.

Thus it is an aspect of the present invention to provide a stamped clutch hub or housing having an improved sealing surface.

It is a further aspect of the present invention to provide a stamped clutch hub or housing having an improved sealing surface including a thin layer of sprayed steel or ceramic material.

It is a still further aspect of the present invention to provide a single piece stamped clutch hub or housing having an improved sealing surface.

It is a still further aspect of the present invention to provide a single piece stamped clutch hub or housing having an improved sealing surface including a thin layer of sprayed steel or ceramic material.

It is a still further aspect of the present invention to provide a single piece stamped clutch hub or housing having an improved sealing surface including a thin layer of sprayed steel or ceramic material having a hardness higher than the hardness of the stamped steel.

It is a still further aspect of the present invention to provide a single piece stamped clutch hub or housing having female splines and an improved sealing surface including a thin layer of sprayed steel or ceramic material.

It is a still further aspect of the present invention to provide a single piece stamped clutch hub or housing having female splines and an improved sealing surface including a thin layer of sprayed steel or ceramic material having a hardness higher than the hardness of the stamped steel.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
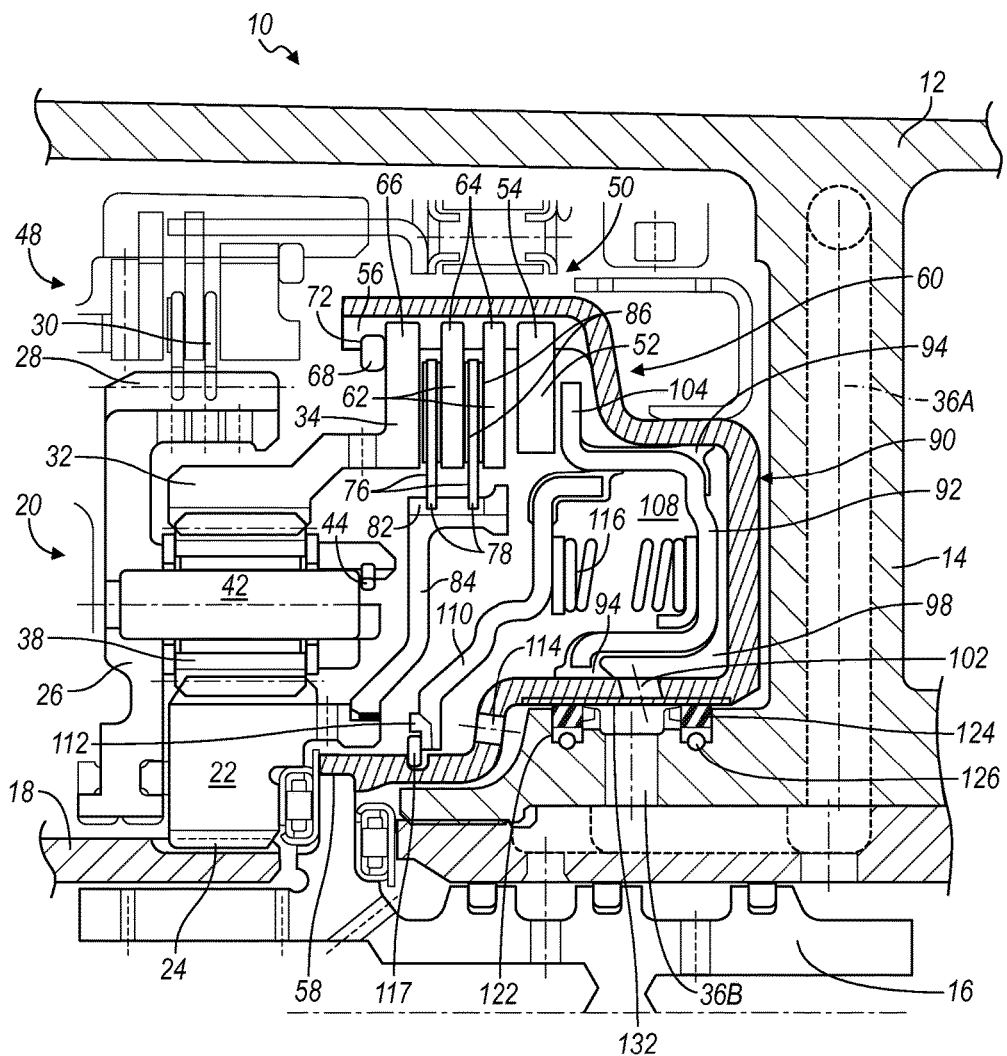
FIG. 1 is a fragmentary, sectional view of a portion of an automatic transmission incorporating the present invention.

With reference to FIG. 1, a portion of a motor vehicle automatic transmission is illustrated and generally designated by the reference number 10. The automatic transmission 10 includes a metal housing 12 which mounts, positions and protects various components such as an input or drive shaft 16, a concentrically disposed quill 18, a plurality of planetary gear assemblies 20, one of which is illustrated in FIG. 1, fluid passageways 36A and 36B and a plurality of friction clutch assemblies, two of which, designated 48 and 50, are illustrated in FIG. 1.

The illustrated planetary gear assembly 20 includes a sun gear 22 which is coupled through interengaging male and female splines 24 to the quill 18. The planetary gear assembly 20 also includes a planet gear carrier 26 which is concentrically disposed about the quill 18 and is coupled through interengaging male and female splines 28 to friction plates 30 in the first friction clutch assembly 48. A ring gear 32 of the planetary gear assembly 20 is coupled to or integrally formed with a backing or reaction plate 34 of the second friction clutch assembly 50. Disposed between the sun gear 22 and the ring gear 32 is a plurality of, typically three or four, planet gears 38 which are in constant mesh with both the sun gear 22 and ring gear 32. The planet gears 38 are freely rotatably disposed on a like number of stub shafts 42 which are retained in the planet gear carrier 26 by a snap ring 44 or similar fastener device.

The second friction clutch pack assembly 50 includes an apply plate 52 having male splines 54 disposed about its periphery which engage a plurality of female splines 56 within a clutch hub or housing 60 and thus rotate therewith. The clutch hub or housing 60 is preferably secured to the input or drive shaft 16 by a continuous circular weld 58 or a plurality of discontinuous welds. The friction clutch pack assembly 50 also includes a plurality of first or reaction plates or discs 62 having male splines 64 which engage and are complementary to the female splines 56 in the clutch hub or housing 60. The backing or reaction plate 34 which is coupled to the ring gear 32 of the planetary gear assembly 20 also includes male splines 66 which are complementary to and engage the female splines 56 on the housing 60 and thus the ring gear 32 rotates with the clutch hub or housing 60. The backing or reaction plate 34 is retained in the clutch hub or housing 60 by a snap ring 68 which is received within a complementary channel or groove 72 in the clutch hub or housing 60.

Interleaved with the plurality of first or reaction plates or discs 62 is a plurality of second friction plates or discs 76 which include female splines 78 about their inner edges which engage complementary male splines 82 on a circular hub or collar 84 which is secured to or integrally formed with the sun gear 22 of the planetary gear assembly 20. The plurality of second friction plates or discs 76 are conventional and include friction facing material 86 on both faces or surfaces.

Figure 2:
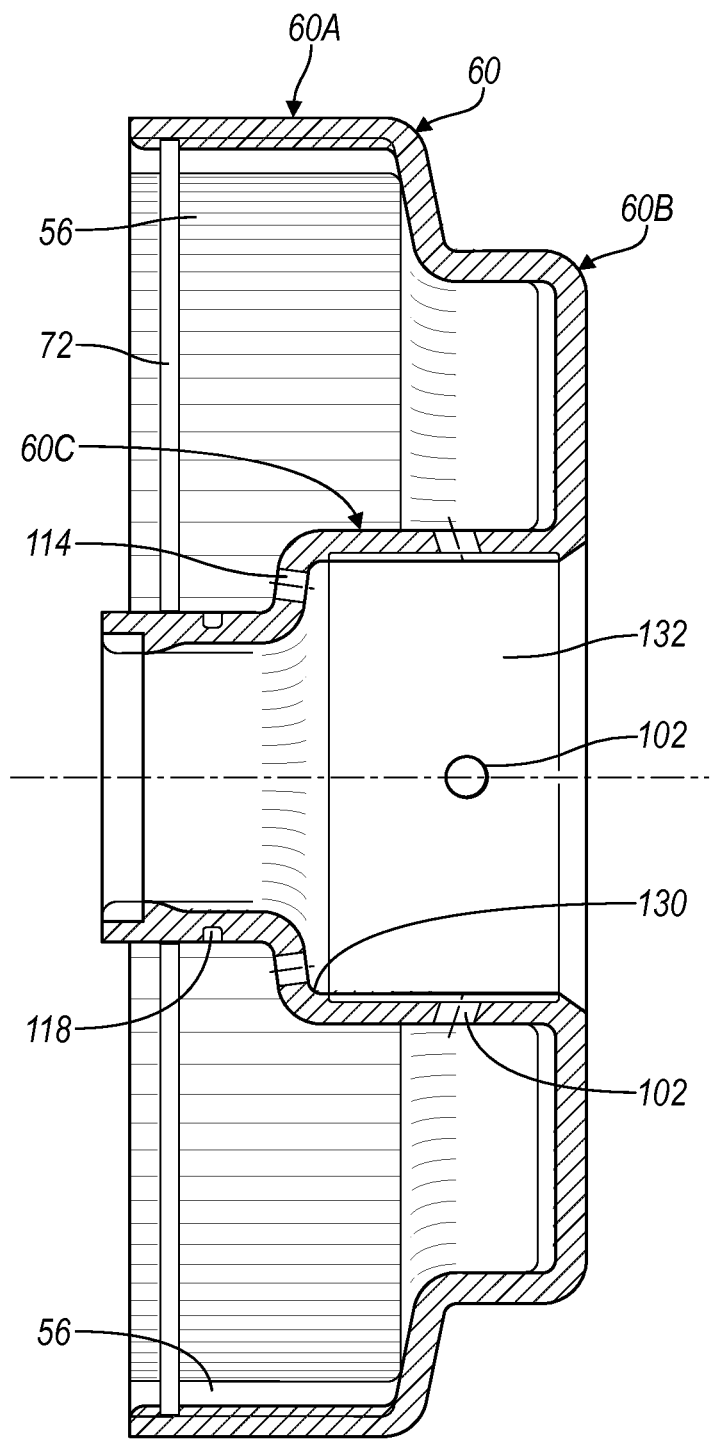
FIG. 2 is a full, sectional view of a friction clutch hub or housing according to the present invention.

Referring now to FIGS. 1 and 2, the second friction clutch pack assembly 50 also includes a balanced hydraulic operator or actuator 90. The balanced hydraulic operator or actuator 90 includes a piston 92 which, in cooperation with resilient seals 94 and an interior surface of the clutch hub or housing 60, defines a first, circular actuating chamber 98. The first, actuating chamber 98 receives pressurized hydraulic fluid through a plurality of circumferentially spaced apart ports or apertures 102 in the clutch hub or housing 60 which communicate with the fluid passageways 36A and 36B. Preferably, there are four ports or apertures 102 although this number may be adjusted up or down and the diameter of the ports or apertures 102 varied to suit engineering requirements. The piston 92 includes a radially outwardly extending circular arm or portion 104 which engages and translates the apply plate 52 to compress the first and second pluralities of plates 62 and 76 to effect torque transfer. The balanced hydraulic operator or actuator 90 also includes a second, balancing or compensating chamber 108 which is on the opposite side of the piston 92 from the first, actuating chamber 98 and is defined by the piston 92 and a complexly configured circular plate 110 having seals 112 on its inner and outer edges. A plurality of ports or apertures 114, typically four, provides hydraulic fluid to the second, balancing or compensating chamber 108. A plurality of return compression springs 116, one of which is illustrated in FIG. 1, reside in the second, balancing or compensating chamber 108 and bias the piston 92 to an at rest position, to the right in FIG. 1, which releases the second friction clutch pack assembly 50 when hydraulic pressure on the first, actuating chamber 98 is relaxed, thereby terminating torque transfer through the second friction clutch pack assembly 50. The circular plate 110 is maintained in a fixed axial position by a snap ring 117 which is received within a circumferential groove or channel 118 in the clutch hub or housing 60.

The metal housing 12 of the transmission 10 includes a stationary bulkhead 14 which defines or includes the fluid passageways 36A and 36B. On opposite sides of the plurality of circumferentially spaced apart ports or apertures 102 in the clutch hub or housing 60 are a pair of axially spaced apart channels or grooves 122 formed in the bulkhead 14 which each receive one of a respective pair of thermoplastic seal rings 124. The seal rings 124 preferably have a square or rectangular cross section and are energized or biased into contact with the clutch hub or housing 60 by resilient O-rings 126 disposed between the seal rings 124 and the bottoms of the channels or grooves 122.

Referring now to FIG. 2, the clutch hub or housing 60 includes an outer annular portion 60A, a stepped radially extending portion 60B and a stepped inner annular portion 60C having an inner annular surface 130 which extends axially to the left and right of the plurality of circumferentially spaced apart ports or apertures 102 and includes a layer 132 of a sprayed steel or ceramic material. The layer 132 of material typically and preferably exhibits a hardness of at least 28 hrc.

Figure 3:
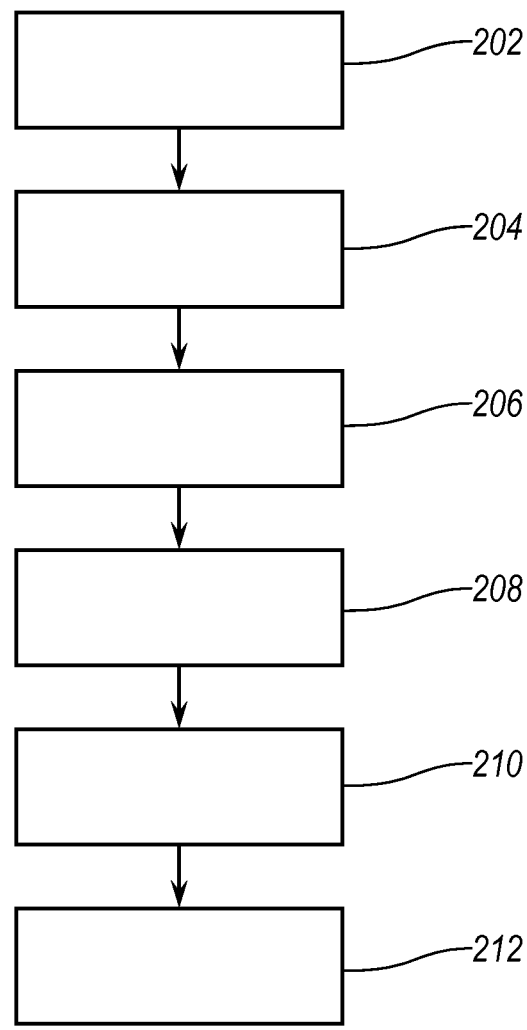
FIG. 3 is a process flow chart presenting the manufacturing or fabrication steps of a friction clutch hub or housing according to the present invention.

Referring now to FIG. 2 and particularly FIG. 3, the manufacturing or process 200 and the individual steps utilized to fabricate the clutch hub or housing 60 are presented. The process begins in a process step 202 in which the hub or housing 60 is stamped, in a single or progressive die, into the shape illustrated in FIG. 2. In a following process step 204, the various openings such as the ports or apertures 102 and 114 are drilled in the hub or housing 60. Next, in a process step 206, the inner annular surface 130 is treated with, for example, a chemical cleaner or a fine abrasive to create a surface finish to which the spray coated layer 132 will readily and securely adhere.

In a process step 208, the spray coated layer 132 of steel, steel alloy or ceramic material is applied to the inner annular surface 130 of the hub or housing 60. This may be accomplished by either a thermal spray process or a cold spray process. The thermal spray process utilizes a heat source such as a flame and the metal or ceramic coating material in powder or wire form is melted into tiny droplets and sprayed onto the annular surface 130 at high velocity. There are several types of thermal spray processes, all of which may be utilized to apply the layer 132 of material to the annular surface 130: high velocity oxygen fuel (HVOF), plasma transferred wire arc (PTWA), two wire arc (TWA), plasma spray (APS), flame spray (oxygen/fuel), electric wire arc spray, and powder plasma, to name the more common processes. Metal based coatings may be, for example, steel and steel alloys, stainless steel, tungsten carbide, carbide chrome, carbide, Babbitt, nickel-chrome, and molybdenum. Ceramic based coatings may be, for example, aluminum oxide, titanium oxide, zirconium oxide, chromium oxide and blends of these materials.

The cold spray process provides a similar surface to that achieved by thermal spraying. The cold spray process utilizes solid powders of metals, alloys or ceramics ground to a very fine particle size (1 to 50 microns). The particles are accelerated to supersonic speeds and directed to the surface 130 of the hub or housing 60 to be coated so that they violently collide therewith. The high impact speed causes the particles to plastically deform upon impact with the surface 130, which creates a true metallurgical bond between the particles and the surface 130. This action creates a layer 132 of the material and a surface having the properties of the applied coating material. The cold spray process is accomplished at relatively low temperatures, well below the melting point of the applied material, which means that the physical properties of the material remain the same during and after deposition. Cold spray materials are generally the same as the metal and ceramic material delineated above.

After the layer 132 of steel, steel alloy, ceramic or other material has been deposited on the inner annular surface 130 of the hub or housing 60, the layer 132 may be machined in a process step 210 both to achieve a final, desired inside diameter of the material layer 132 on the inner annular surface 130 and to provide a desired surface finish, e.g., smoothness. Nominally, the thickness of the material layer 132 will be on the order of 0.015 mm. (0.00059 in.) although this thickness may be increased or decreased to suit particular applications and service requirements In a final process step 212, the finished clutch hub or housing 60 is welded to the input or drive shaft 16 to form a complete assembly for use in the automatic transmission 10.

As stated above, the layer 132 of steel or ceramic material typically and preferably exhibits a hardness of at least 28 hrc. Thus, according to the invention, the clutch hub or housing 60 may be fabricated of a steel alloy such as SAE 1010, HSLA 340 or HSLA 420 which is readily stamped and welded but which also includes the layer 132 of sprayed steel or ceramic material having much greater hardness and durability than the steel which is capable of withstanding extended rotational, frictional contact by the resilient seals 124 or similar components. It should be appreciated that while the present invention is described herein in relation to the inner annular surface 130 of the clutch hub or housing 60, the material layer 132 may be applied, through one of the processes described above, to other wear surfaces of the hub or housing 60 or to wear surfaces of other transmission components such as shafts, quills and supports fabricated of such steel alloys as those listed directly above thereby enjoying the significant benefits conferred by this invention: ease of fabrication by, for example, stamping and improved fluid sealing and service life of wear surfaces.

The description of the invention is merely exemplary in nature and variations that do not depart from the gist of the invention are intended to be within the scope of the invention. Such variations are not to be regarded as a departure from the spirit and scope of the invention.

What is claimed is:

1. A clutch housing adapted to receive a friction clutch assembly comprising, in combination,
a circular body having an outer annular portion, a stepped inner annular portion and a stepped, radially extending portion joining said outer annular portion and said inner annular portion, said outer annular portion having an inner surface and a plurality of female spines on said inner surface, said stepped inner annular portion having a first, larger diameter portion, a second, smaller diameter portion and an intermediate portion joining said first and second portions, a first plurality of fluid passages in said first, larger diameter portion of said inner annular portion, a second plurality of fluid passages in said intermediate portion of said inner annular portion, said first, larger diameter portion of said stepped inner annular portion having an inner surface, said inner surface including a layer of material having a hardness of at least 28 hrc,
wherein said layer of material in said inner surface on said first, larger diameter portion of said stepped inner annular portion extends axially on both sides of said first plurality of fluid passages and does not extend to said second, smaller diameter portion and said intermediate portion.

2. The clutch housing of claim 1 wherein said layer of material is one of steel, a steel alloy or a ceramic material.

3. The clutch housing of claim 1 further including a groove adapted to receive a snap ring disposed on an outside surface of said second, smaller diameter portion of said inner annular portion.

4. The clutch housing of claim 1 further including a drive shaft secured to an inner surface of said second, smaller diameter portion of said inner annular portion.

5. The clutch housing of claim 1 further including a groove adapted to receive a snap ring disposed in said female splines on said inside surface of said outer annular portion.

6. The clutch housing of claim 1 wherein said circular body of fabricated of one of SAE 1010, HSLA 340 and HSLA 420 steel.

7. A clutch housing for a motor vehicle automatic transmission comprising, in combination,
a circular body having an outer annular portion, a stepped, radially extending portion merging with said outer annular portion and a stepped inner annular portion merging with said stepped, radially extending portion, said outer annular portion having an inner surface and a plurality of female spines forming said inner surface, a groove adapted to receive a snap ring disposed in said female splines on said inside surface of said outer annular portion, said stepped inner annular portion having a first, larger diameter portion, a second, smaller diameter portion and an intermediate portion joining said first and second portions, a second groove adapted to receive a snap ring disposed on an outside surface of said second, smaller diameter portion of said inner annular portion, a first plurality of fluid passages in said first, larger diameter portion of said inner annular portion, a second plurality of fluid passages in said intermediate portion of said inner annular portion, said first, larger diameter portion of said stepped inner annular portion having an inner surface, said inner surface including a layer of material having a hardness of at least about 28 hrc,
wherein said layer of material in said inner surface on said first, larger diameter portion of said stepped inner annular portion extends axially on both sides of said first plurality of fluid passages and does not extend to said second, smaller diameter portion and said intermediate portion.

8. The clutch housing of claim 7 wherein said layer of material is one of steel, a steel alloy or a ceramic material.

9. The clutch housing of claim 7 further including a drive shaft secured to an inner surface of said second, smaller diameter portion of said inner annular portion.

10. The clutch housing of claim 7 wherein said circular body of fabricated of one of SAE 1010, HSLA 340 and HSLA 420 steel.

11. An assembly for a motor vehicle automatic transmission comprising, in combination,
- a stationary bulkhead defining a fluid passageway, a first aperture, and a second aperture, wherein said first and second apertures are disposed on opposite sides of said fluid passageway;
- a clutch housing having a body having an outer annular portion, a stepped, radially extending portion merging with said outer annular portion and a stepped inner annular portion merging with said stepped, radially extending portion, said outer annular portion having an inner surface and a plurality of female spines on said inner surface, said stepped inner annular portion having a first, larger diameter portion, a second, smaller diameter portion and an intermediate portion joining said first and second portions, a first plurality of through openings in said first, larger diameter portion of said inner annular portion in communication with said fluid passageway of said stationary bulkhead, a second plurality of through openings in said intermediate portion of said inner annular portion, said first, larger diameter portion of said stepped inner annular portion having an inner surface, said inner surface including a layer of material having a hardness of at least about 28 hrc;
- a drive shaft secured to an inner surface of said second, smaller diameter portion of said inner annular portion;
- a first ring seal disposed in said first aperture and sealed to said inner surface of said first, larger diameter portion of said inner annular portion; and
- a second ring seal disposed in said second aperture and sealed to said inner surface of said first, larger diameter portion of said inner annular portion, and
- wherein said layer of material in said inner surface on said first, larger diameter portion of said stepped inner annular portion extends from where said first ring seal is sealed to said inner surface of said first, larger diameter portion to where said second ring seal is sealed to said inner surface of said first, larger diameter portion.

12. The assembly of claim 11 wherein said layer of material is one of steel, a steel alloy or a ceramic material.

13. The assembly of claim 11 wherein said layer of material in said inner surface on said first, larger diameter portion of said stepped inner annular portion extends axially on both sides of said first plurality of openings.

14. The assembly of claim 11 further including a groove adapted to receive a snap ring disposed on an outside surface of said second, smaller diameter portion of said inner annular portion.

15. The assembly of claim 11 further including a groove adapted to receive a snap ring disposed in said female splines on said inside surface of said outer annular portion.

* * * * *